July 13, 1965  E. H. LAND ETAL  3,194,137
CAMERA APPARATUS FOR EXPOSING AND PROCESSING PHOTOGRAPHIC FILM
Filed April 10, 1961  5 Sheets-Sheet 1
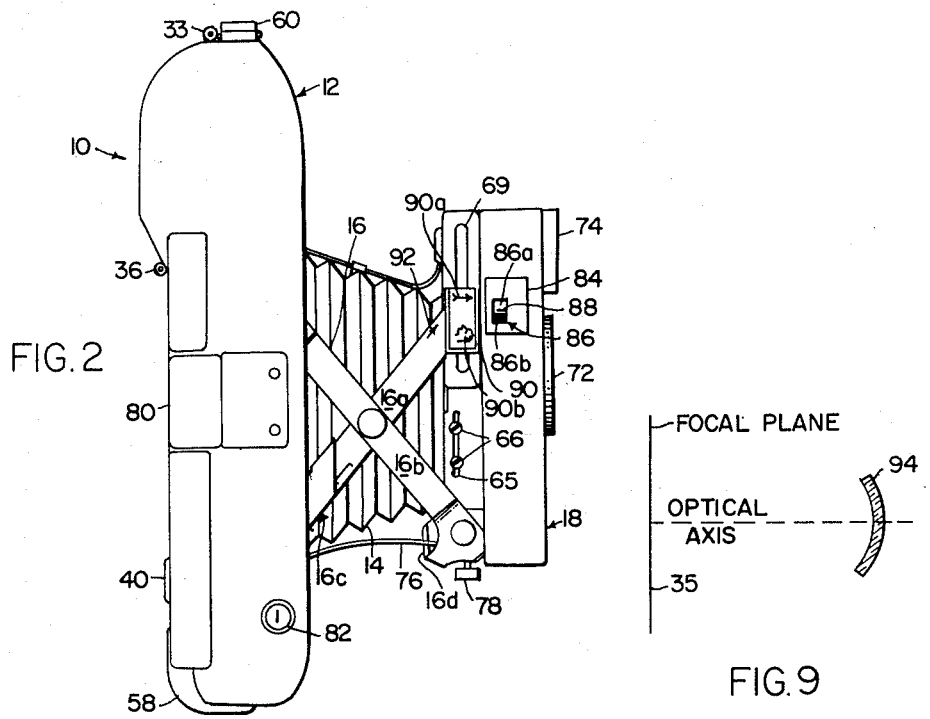
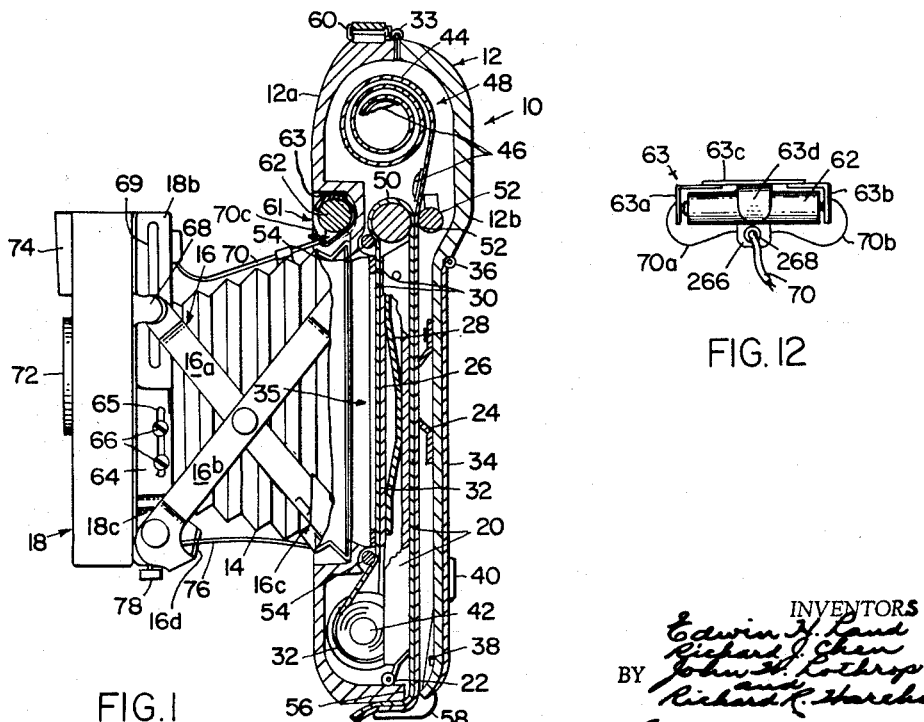

July 13, 1965 E. H. LAND ETAL 3,194,137
CAMERA APPARATUS FOR EXPOSING AND PROCESSING PHOTOGRAPHIC FILM
Filed April 10, 1961 5 Sheets-Sheet 2

INVENTORS
Edwin H. Land
Richard J. Chen
BY John W. Lothrop
Richard R. Wareham
Brown and Mikulka
ATTORNEYS July 13, 1965  E. H. LAND ETAL  3,194,137
CAMERA APPARATUS FOR EXPOSING AND PROCESSING PHOTOGRAPHIC FILM
Filed April 10, 1961  5 Sheets-Sheet 3

| ROTATION OF VANE | BRIGHTNESS OF SCENE CANDLES/FT.² | SHUTTER $\frac{1}{T}$ SECONDS | EV at f/31.7 3000 SPEED FILM |
|---|---|---|---|
| 4° | 6.25 | 15 | 14 |
| 8° | 12.5 | 30 | 15 |
| 15.7° | 25 | 60 | 16 |
| 27.4° | 50 | 120 | 17 |
| 37° | 100 | 240 | 18 |
| 44.8° | 200 | 480 | 19 |
| 50.8 | 400 | 960 | 20 |
| 55° | 800 | 1920 | 21 | f/63    f/44.7    f/31.7    f/22.4    f/18.9
                  NORMAL

◌       ○        ○         ○         ▢

INVENTORS
Edwin H. Land
Richard J. Chen
BY John W. Lothrop
and
Richard R. Wareham
Brown and Mikulka
ATTORNEYS July 13, 1965  E. H. LAND ETAL  3,194,137
CAMERA APPARATUS FOR EXPOSING AND PROCESSING PHOTOGRAPHIC FILM
Filed April 10, 1961  5 Sheets-Sheet 4

INVENTORS
Edwin H. Land
Richard J. Chen
BY John W. Lothrop
and
Richard R. Wareham
Brown and Mikulka
ATTORNEYS July 13, 1965 E. H. LAND ETAL 3,194,137
CAMERA APPARATUS FOR EXPOSING AND PROCESSING PHOTOGRAPHIC FILM
Filed April 10, 1961 5 Sheets-Sheet 5

INVENTORS
Edwin H. Land
Richard J. Chen
BY John W. Lothrop
Richard R. Wareham
Broward Mikulka
ATTORNEYS

United States Patent Office 3,194,137
Patented July 13, 1965

3,194,137
CAMERA APPARATUS FOR EXPOSING AND PROCESSING PHOTOGRAPHIC FILM
Edwin H. Land, Cambridge, Richard J. Chen, Brockton, John W. Lothrop, Westwood, and Richard R. Wareham, Marblehead, Mass., assignors to Polaroid Corporation, Cambridge, Mass., a corporation of Delaware
Filed Apr. 10, 1961, Ser. No. 102,047
6 Claims. (Cl. 95—11)

This invention relates to camera apparatus of a type for exposing and processing a photographic film in which a processing liquid is spread between photosensitive and image-receiving layers and a positive print is produced by the diffusion transfer of image-forming substances. The camera includes, as components of a relatively uncomplicated and economical structure, various cooperating mechanisms which together make it possible to obtain a photographic print of particularly high quality.

Objects of the invention are to provide a camera of the character described in which are incorporated mutually operative manual and automatic features for producing photographic prints of improved quality; to provide in a camera, as described, cooperating elements for insuring that an exposure can be made only when the relevant camera mechanisms are set in readiness therefor; to provide a camera of the aforementioned type wherein a minimum of structural elements of relatively simple design are employed to enable ease of operation and keep cost at a minimum; to provide a camera of the character described embodying a flashgun of a novel type specially adapted to the exposure characteristics of the camera and the film usable therewith; to provide in a camera a mounting socket and a battery type of power supply both of which are optionally usable relative either to a flashgun or a radio transmitter for actuating a remotely located stroboscopic illuminating device; to provide a camera embodying novel automatic photoelectrically actuated shutter control and flashgun switching means; to provide a camera as described having diaphragm aperture adjusting means permitting the flexibility of a choice of aperture sizes and shapes; to provide a camera embodying automatic shutter speed control which is adapted to both indoor and outdoor picture taking; to provide a camera of the character described embodying a single, front curving meniscus lens with a flat focal plane; and to provide in a camera, as set forth, novel and convenient means for removing an exhausted flashgun battery.

Other objects of the invention will in part be obvious and will in part appear hereinafter.

The invention, accordingly, comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is an elevational view, partly in section, of the camera of the invention taken from the left-hand side;

FIG. 2 is an elevational view of the camera taken from the right-hand side;

FIG. 9 is a schematic diagram relating to the camera optical system;

FIG. 12 is a diagrammatic view of the camera battery, battery clip and means for removing the battery when exhausted;

Figure 3:
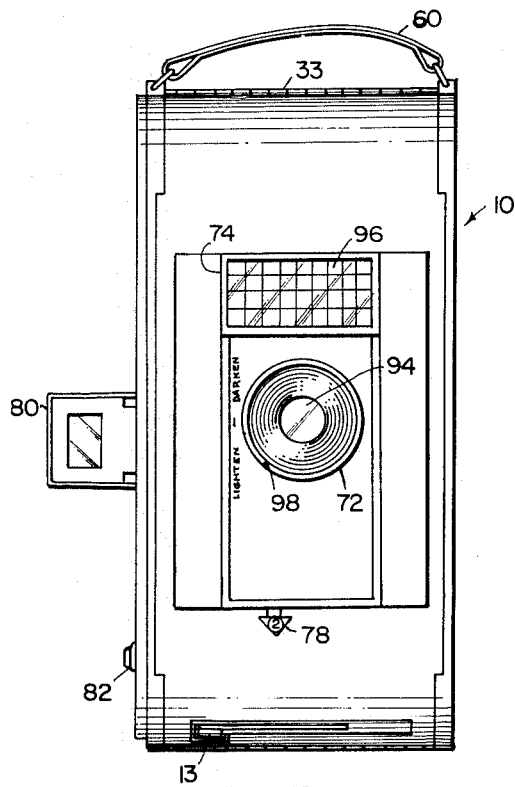
FIG. 3 is a front view of the camera.

A camera of the type concerned herein generally comprises means for supplying and exposing a photographic material which includes a film or layer of a photosensitive silver halide emulsion carried by a base or supporting layer and for processing the emulsion after its exposure. Through the diffusion transfer of image-forming substances, the processing operation provides a positive print on a second film or sheet material which will be termed the image-receiving sheet or surface and which is either integral with the first-mentioned film or separately supplied in the camera and brought to superimposition therewith. A processing liquid is releasably contained on or within one of the materials, preferably in a rupturable liquid container attached to the image-receiving sheet, and is spread throughout the exposed emulsion area, when superimposed with the sheet, through movement of the materials relative to pressure-applying members of the camera. The image-receiving sheet may, of itself, serve as an image-receiving layer for a visible print of a latent image formed in the emulsion by the photographic exposure or it may carry a surface coating specially serving such a purpose. The diffusion transfer of image-forming components from the emulsion to the image-receiving surface to produce the print involves the development of a latent image in the exposed emulsion to silver. In the case of producing a black-and-white image this is accompanied by the formation in the emulsion of a soluble silver complex which is caused to transfer to the image-receiving sheet. In the production of a print in color, dye image-forming substances such as dyes or color couplers are employed for transfer to the image-receiving surface.

Photographic materials and processes of the general type contemplated in the aforementioned diffusion transfer operations are described in detail in U.S. Patents Nos. 2,543,181, 2,968,554 and 2,983,606 and in the copending application of Land et al. Serial No. 565,135, filed February 13, 1956. The camera apparatus described herein is not strictly limited to particular types of photosensitive and image-receiving films. However, in general, materials of the above-described types are eminently suited for use therewith. More particularly, the camera is especially adapted to use with a "fast" film of the category mentioned in the copending application of Land et al., Serial No. 564,492, filed February 9, 1956, now abandoned. One such "fast" film having an A.S.A. film speed of 3000 is now being commercially sold by applicants' assignee.

The camera of the present invention may be characterized, broadly, as a self-processing camera. More particularly, it may be regarded as of a hand-held automatic type, employing photoelectric means for establishing proper shutter settings, in conjunction with manually adjustable diaphragm openings and manually actuated but simplified focussing means. Other features of the camera, some of which are novel and others conventional, together with special combinations thereof will now be described in detail. Whereas certain of these features may bear a resemblance to those heretofore employed in other cameras in the self-processing or in different fields, they are so employed and combined herein as to provide a picture-taking device which has marked advantages over previous cameras of a generally related category in its simplicity, flexibility, and ease of operation and by reason of its ability to produce prints of extremely high quality.

Referring now to the drawings, the camera 10 is shown in FIG. 1 from the left-hand side and will be noted as being a hand-held camera of a folding type. Basically, the camera comprises a main housing or back 12 containing processing apparatus in which a film is positioned for exposure and processing, a bellows 14, a scissors type erecting mechanism 16, and a front 18, the latter containing the principal elements for accomplishing the photographic exposure including a photovoltaic cell and the lens, shutter and diaphragm components.

The structure of the camera back 12, containing the film processing apparatus, may be considered as generally conventional but possessing a few unique features which will appear hereinafter. The back 12 is divided into two principal chambers, namely, into what may be termed a front or exposure chamber and a rear or processing chamber, by pivotal wall member 20, the latter being hingedly connected to the casing at 22. The terms front and rear, as used herein in referring to the location of components, relate to their proximity to or remoteness from, respectively, the front of the camera or the object being photographed. The forward position of pivotal member 20 is established by flange elements 23 extending from the casing and by a pair of spring finger elements 24 (one shown) attached to the rear wall of the housing and bearing against the rear edges of member 20. A pressure plate 26 biased by a spring 28, respectively attached thereto and to pivotal wall member 20, taken with frame elements 30, holds the film material 32 properly at the focal plane of the camera. The camera back is constructed of front and rear wall sections 12a and 12b, respectively, pivotally connected to one another at hinge 33 and held at closed position at the bottom by a latch 13, shown in FIG. 3. The rear wall section 12b, in turn, includes an access means thereinto in the form of a door 34, hinged at 36 and having a latch 38 with release button 40. Door 34 is employed, primarily, to lift out each completed print along semi-perforations from a continuous strip of image-receiving sheet material.

A supply of film 32 in roll form is contained on a spool 42. A supply of the image-receiving sheet material 44 composed, for example, of a roll of baryta-coated paper and having a plurality of rupturable containers 46 releasably holding a processing liquid which are located at given intervals on the image-receiving surface, is somewhat loosely mounted in an appropriate compartment or subsection 48 of the back.

A pair of pressure rolls 50 and 52 is mounted within the camera back. These rolls are employed to apply pressure to the exposed film 32 and image-receiving sheet 44, when they are drawn therebetween in superimposed relation, and to rupture the liquid container and spread the processing liquid throughout the emulsion area. Pressure roll 50 is mounted in front section 12a while pressure roll 52 is mounted in rear section 12b, the two rolls being positioned contiguously when these two sections are pivoted to closed position.

The photosensitive film material 32 and sheet 44 are loaded in the camera by opening the rear section 12b and then swinging the inner pivotal wall member 20 to open position. As above explained, this separates the pressure rolls, due to their being mounted in the individual sections and also provides access to the interior. A leader of the film 32 is drawn across the focal plane 35, past guide rolls 54, around pressure roll 50 and across the back of pivotal member 20. A leader of the image-receiving sheet 44 is guided around pressure roll 52 and across the back of pivotal member 20 in superimposed relation with the film leader 32. The most advanced portions of the two leaders are then positioned in an exit aperture 56 provided by a narrow gap between the front and rear sections 12a and 12b so that a small tab of the leaders extends exteriorly of the housing. The film and receiving sheet materials are usually supplied as components partially attached to one another an thus may be considered as constituting a single unit. Complete instructions are provided for installing and metering the materials to functional positions such that emulsion areas are properly positioned for exposure and the liquid containers and image-receiving areas of the image-receiving sheet are properly positioned relative to the exposed image areas of the film. This occurs automatically once the leaders have been threaded. A pivotal cutter bar 58, adjacent to the exit aperture 56, has a cutting blade which is movable across the aperture and serves to sever lengths of exposed and processed, to-be-discarded negative film material which have been superimposed with waste portions of the image-receiving sheets, these materials being portions which remain and are not usable after completion of the print. Where the film is of a type which produces a permanent negative, the latter is, of course, preserved.

Further considering the camera back 10, a handle 60 is included for carrying purposes. A recess 61 is provided in the camera back 12 for releasably mounting a battery 62 which serves as a voltage supply for the flashgun or for a radio transmitter, to be described. The battery is releasably mounted in a clip 63 and structure relating thereto is shown in FIG. 12 and will be described in detail below.

The camera front 18 is connected at either side of bellows 14 with the back 10 by scissors type supports 16 comprising link elements 16a and 16b. The split and folded-over construction of elements 16a in portions 16c thereof nearest the camera back provides a frictional contact of these portions with elements 16b when the camera front is folded within the back and serves, in contrast to usual spring-type holding means, to releasably hold the front at this closed position. The links 16b are connected at the bottom by a cross-piece 16d, unitary therewith, and their upper extremities are slidably mounted in tracks (not shown) provided within the sides of the housing. The bellows 14 is preferably constructed of a cloth material impregnated with a plastic and provides a conventional light-tight enclosure between lens and focal plane. On each side of the camera front is an adjusting plate 64 having a slot 65 formed therein and a pair of adjusting screws 66 which pass through the slot and are threaded in the wall of the front 18. These elements are employed to perform a preliminary or factory collimating adjustment, namely, an adjustment of the spacing between the lens and the focal plane. A further reference to this adjustment will be given below relative to FIG. 5. Other elements shown in FIG. 1, include a two-position detent-actuating button 68 which permits optional insertion of a stud 118 (shown in FIG. 5) in either of two recesses. The shank of the stud passes through slot 69 and is attached to the extremity of link 16a. This structure permits adjustment of focus to two positions. Also shown are the electrical cable connector 70, the diaphragm adjusting bezel element 72, the photoelectric cell 74, the shutter release actuating cable 76, and the shutter cocking lever 78.

In FIG. 2, the camera is shown from the right-hand side. Elements additional to those illustrated in FIG. 1 include a viewfinder 80, shutter release button 82 and an indicator 84 of the light available for the exposure. The light indicator 84 comprises a dial 86 and pointer 88, the pointer being actuated by a galvanometer 86 mounted within front 18 and shown in FIG. 6. The galvanometer is responsive to the voltage fluctuations of photovoltaic cell 74 and, in turn, controls shutter speed, as will be explained hereinafter. The dial is composed of two sections, in side-by-side relation, across which the pointer is free to move, namely, a light density section 86a and a dark section 86b. Assuming a workable light level for picture taking, to exist, when the pointer is positioned against the light density background, it indicates that the available light and the position or aim of the camera are such as to provide a degree of light incident upon the photovoltaic cell 74, and, coincidentally, upon the film when the shutter is actuated, which will enable automatic control of shutter operation to produce a satisfactory print. When the pointer is seen against the dark background, the incident light is indicated as being insufficient for proper operation due to the generally inadequate prevailing light level or to incorrect aim of the camera. Provision of additional light may be obtained through adjustment of adjusting bezel 72 and use of the flashgun.

A multi-prismatic transparent plate is mounted across dial 86. The angles of the prism surfaces are so chosen as to make it possible for the operator to see pointer 88 only when the camera is properly aimed with respect to the photographic subject. This position is substantially achieved when it is possible to see the pointer when looking through the viewfinder 80.

Also shown is a plate 90 containing symbolic indicia for use in establishing proper focus for general and close-up photography. Plate 90 is secured to the face of a detent-actuating button similar to button 68 of FIG. 1 and movable therewith when pressed. The plate contains a picture of one or more human figures 90a, symbolizing a setting for general picture taking, e.g., from approximately five feet to infinity, and a human head 90b representing a setting for close-up picture taking, e.g., from approximately three and one-half feet to eight feet. These values are given assuming a diaphragm setting of approximately f/32 with the diaphragm aperture assuming a round shape, as shown in FIG. 8. An arrow 92, formed on link 16a points toward one or the other of these symbols depending upon whether the subject is located for a "general" setting or for a "close-up" setting. The plate 90 of FIG. 2 and the detent button 68 of FIG. 1 are pressed inwardly at the same time to change the setting. This releases the stud 118 from its location in one of the two apertures 114 and 116, shown in detail in FIG. 5, and enables its placement in the other aperture. This operation is performed by moving the front 18 in or out causing movement of the shank of the stud, which is attached to the extremity of link 16a, along slot 69 while, coincidentally moving the upper extremities of links 16b along their tracks in the housing. When the stud 118 is located in the upper aperture, as represented by arrow 92 pointing toward human figure symbol 90a, the scissors supports 16 are slightly closed and the spacing between the lens and focal plane is diminished. When the locking stud is in the lower aperture the arrow 92 points toward the face symbol 90b, the scissors supports 16 are slightly opened and the spacing between the lens and focal plane is at its maximum. The foregoing mechanism permits a rapid and simple adjustment of focus according to variations in distance between the camera and the photographic subject.

In FIG. 3, the camera 10 is illustrated from the front. Elements not previously shown include the single, front-curving, meniscus lens 94, the latch 13 which is pivotable outwardly toward the viewer to release the front and rear casing sections 12a and 12b from closed relation, and a honeycomb type of grill 96 covering the face of the photovoltaic cell 74. The diaphragm aperture is varied in size and shape, as described in detail relative to FIGS. 7 and 8, by rotating the bezel 72. The idex mark 98 on the bezel is moved to either the "lighten" or "darken" positions designated on the camera front, as may be indicated as necessary by the position of the pointer 88 of dial 86 or by the quality of a just-previously-completed print. Assuming that a subject at practicable range is being photographed the flashgun may be employed if additional light is required. The viewfinder 80, shown at open position, may be of any suitable type, a so-called "Albada" type of viewfinder being that preferably employed.

Figure 4:
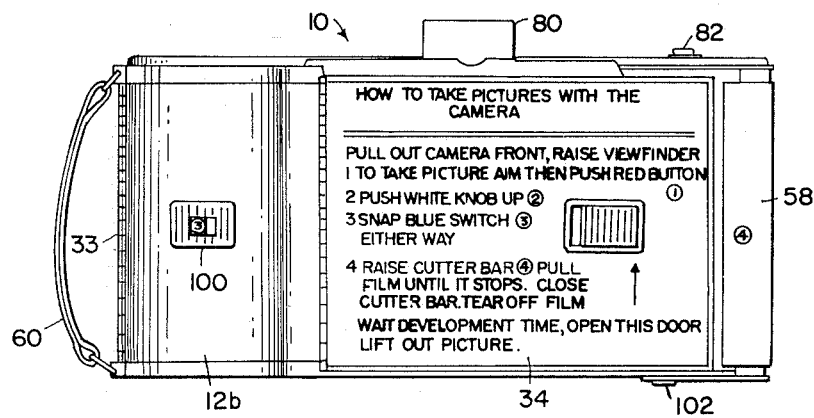
FIG. 4 is a rear view of the camera.

The camera is shown from the rear in FIG. 4. Illustrated are two elements not seen in previous figures. One of these elements is a button or switch 100 which controls internally located detent means (not shown) facilitating proper metering of the film and image-receiving sheet materials during the processing operation. The other element is a tripod socket 102. Also shown is the wording of a series of steps relating to the photographic exposure and processing operations. The numbers refer to those actually stamped on the actuating elements and shown in FIGS. 2, 3 and 4.

Figure 5:
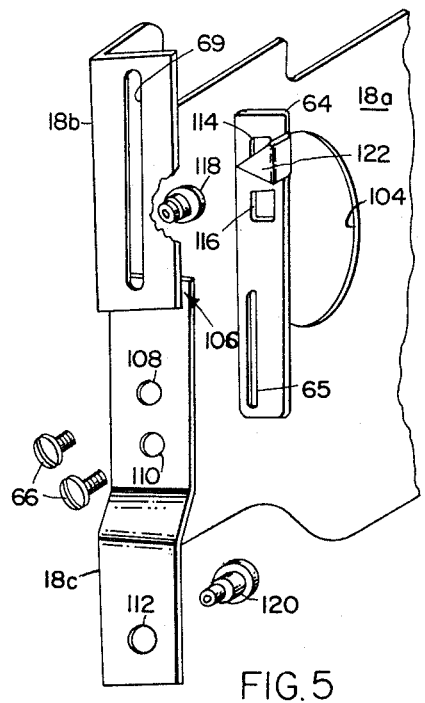
FIG. 5 is a diagrammatic exploded view of focus adjusting mechanism of the camera.
Figures 6, 6A, 8:
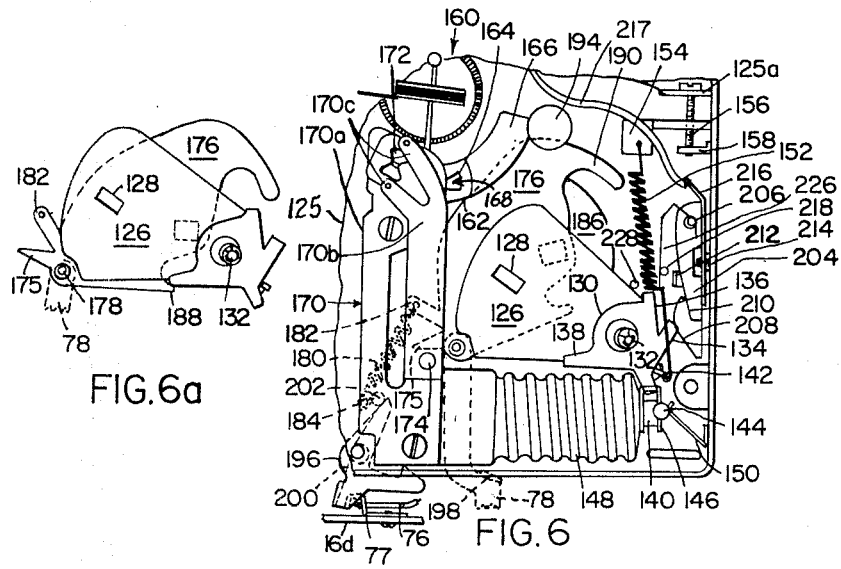
FIG. 6 is an interior rear view of a portion of the camera front showing, diagrammatically, the shutter and switch mechanism for actuating the electrical currents.
FIG. 6a is a fragmentary view showing portions of the shutter and switching mechanisms of FIG. 6 in greater detail.
FIG. 8 is a schematic diagram of the selectively obtainable diaphragm apertures together with a table of relevant data.

FIG. 5 illustrates the preliminary collimating adjustment means alluded to with respect to FIG. 1. Inasmuch as it is viewed from the left-hand side, however, it may most advantageously be considered relative to FIG. 2. Plate element 18a is that portion of the camera front 18 within which, in aperture 104, the meniscus lens and diaphragm are mounted and around which aperture the lens bezel is positioned. Element 18b is a right-angled plate integral with but projecting outwardly beyond element 18a, as shown. Element 18c is a plate, contoured as shown, having perforations 108, 110 and 112, and is an element integral with and extending at 90° from an edge of plate element 18a. However, plates 18b and 18c are spaced from one another as shown at 106. Elements 18a, 18b and 18c are preferably formed of a rigid metallic sheet material. Plate 64, formed of a resilient material such as a metal and having two rectangular apertures 114 and 116 and an elongated slot 65, is positioned in the space 106 between plates 18b and 18c so that slot 65 is aligned with apertures 108 and 110 of plate 18c, and apertures 114 and 116 of plate 64 are aligned with slot 69 of plate 18b. A stud 118 is positioned between plates 64 and 18b with its shank protruding through slot 69 and passing through an eye in the upper extremity of link 16a (FIG. 2). Perforation 112 is connected with an eye in the lower extremity of link 16b by stud 120. Detent button 122 is that to which indicia plate 90 of FIG. 2 is attached, as previously described. Screws 66 pass through perforations 108 and 110 and slot 65 and are threaded in side portions of camera front 18. As will be apparent, when screws 66 are loosened, plate 64 can be moved up or down thus raising or lowering the location of rectangular apertures 114 and 116 into which the head of stud 118 may alternatively be positioned. The stud is released from its location in either of apertures 114 and 116 by pressing manually upon detent release button 122. This serves to bend the resilient plate 64 inwardly removing it from the stud and permitting the shank of the latter to slide freely in slot 69 as provided by link 16a when the camera front is moved inwardly or outwardly. By moving plate 64 upwardly or downwardly and then tightening the screws 66 a basic collimating setting is obtained. In résumé the operational settings, previously described with respect to FIG. 2 and the position of arrow 92, at 90a or 90b, are obtained by alternatively locating the head of the stud in apertures 114 and 116 merely by pressing on the elements 90 and 122 and moving the camera front in or out.

The shutter and switch actuating mechanism for firing a flashgun or other purpose is housed in the camera front 18 and is shown in detail in FIGS. 6 and 6a from a position facing the camera as illustrated in FIG. 3, with the casing removed. The flashgun is mounted in a recess or well 124 formed in the side wall of camera front 18, immediately adjacent to the photovoltaic cell 74, as shown in FIGS. 10a, 10b, 10c and 13. In FIG. 6, the apparatus is illustrated in a functional condition at which it is to be assumed that an exposure has been made by pressing the shutter release button numbered "1," and that the flashgun has been fired. In FIG. 6a it is shown at cocked position. The complete mechanism is mounted on a mounting plate 125, releasably insertable in and fastened to camera front 18 by removable screws. The device comprises a front shutter blade 126, having an exposure aperture 128, rigidly attached to a plate member 130, the latter being rotatably mounted at bearing means 132 so that both elements 126 and 130 rotate as an integral unit. The plate member 130 includes cam element 134, cam element 136, cam follower 138, arm 140 and arm 142.

A forwardly extending stud 144 is mounted at the extremity of arm 140. A clamp 146 is pivotally mounted on the stud 144. The clamp 146 engages one end of a pneumatic bellows 148. The bellows may appropriately be formed of rubber or a synthetic resilient material of similar characterisics. A flat spring 150 limits the expansion of the bellows toward full extension. Arm 142 has an eye formed therein to which is connected one end of the front shutter spring 152. The other end of the front shutter spring is connected to post 154, an eye being formed in the latter for connection purposes. The front shutter spring 152 biases plate 130, and integral front shutter blade 126, in a counterclockwise direction. Spring 152 also exerts pulling force on the bellows 148 to provide maximum extension of the bellows.

An adjusting screw 156 having an externally located head, rotates freely in an orifice formed in a forwardly extending portion 125a of plate 125, is threaded in post 154, and has its tip in contact with fixed bracket 158. Post 154 is mounted for slidable movement, from left-to-right an edge of bracket 158 serving as guide means therefor. Thus, turning of screw 156 adjusts the tension of shutter spring 152.

A galvanometer 160 is operated in response to current from photovoltaic cell 74. The pointer 88 of light indicator 86 is attached to the rotatable coil of the galvanometer. Counterclockwise rotation of the coil, as viewed in FIG. 6, causes the pointer to move to a position in front of the dark portion 86b of the indicator dial which would indicate inadequate light. A vane 162 is also attached to the coil and is rotatable therewith. The vane has an aperture 164 of substantially continuously varying width formed therein. Underlying this vane is an elongated air chamber 166 leading to bellows 148 and a plate member 168 fastened to the air chamber and having an orifice (not shown) formed therein leading to an underlying orifice of the air chamber at the extremity adjacent to the galvanometer vane and lying under the aperture of the vane so as to be aligned with the latter as it is moved thereacross. The varying width of the vane aperture 164 thus allows varying amounts of air to enter the orifice of plate 168 according to the rotational position of the vane, as determined by the current from the photovoltaic cell which controls operation of the galvanometer.

Overlying the movable vane 162 is a two-element clamping member 170, composed of a resilient material such as Phosphor bronze, having an orifice 172 formed in its underlying element 170a which is similar in shape to, but slightly larger than, the orifice of plate 168 and which overlies the latter orifice. The clamping member 170 is caused to bear upon vane 162 just prior to positioning of shutter aperture 128 across the diaphragm aperture to insure that no air enters the orifice of plate member 168 and the air chamber other than through vane aperture 164. The overlying element 170b of clamping member 170 serves a reinforcing clamping function relative to element 170a, it being noted that the two-fingered component 170c of element 170b contacts element 170a for the purpose. A stud 174 extends inwardly from clamping member 170. This stud is actuated by element 175 of the shutter mechanism to control the above-described clamping action of clamping member 170 and will be explained below.

A rear shutter blade member 176 underlies the front shutter blade 126. Element 176 performs several functions among which are those of severing, per se, as a component of the shutter, driving the shutter blade 126 in a clockwise direction against the bias of shutter spring 152, actuating the clamping member 170, and contributing to control of the flashgun contacts. Rear shutter blade 176 is pivotally mounted at bearing means 178 and is biased for rotation in a counterclockwise direction by the rear shutter blade spring 180 which exerts a considerably greater tension than does front shutter blade spring 152 and is sufficient to overcome both the bias of the latter and the extension bias of pneumatic bellows 148. Spring 180 is attached, respectively, to arm 182 of the rear shutter blade and to fixed stud 184 mounted on plate 125. Rear shutter blade 176 has a rectangular aperture (not shown) formed therein and underlying the front shutter blade 126 which is aligned with a fixed aperture (not shown) formed in a plate 186 attached to the mounting plate 125. Plate 186 provides a shield or baffle for preventing the entrance of unwanted light in areas other than through the designated apertures. To accomplish the photographic exposure, the aperture 128 of the front shutter blade passes across the aperture of the rear shutter blade when the latter is in alignment with the aperture of plate 186.

The rear shutter blade 176 also includes cam element 188 which, assuming the shutter to have been cocked and shutter release button 82 to have been pressed, contacts cam follower 138 of the front shutter blade 126 during counterclockwise movement of the rear shutter blade and causes the front shutter blade to rotate in a clockwise direction until cam 188 breaks contact with follower 138. At this stage the front shutter blade commences to rotate in a counterclockwise direction and it is during this movement that aperture 128 passes across the aperture of rear shutter blade 176 and plate 186 and the exposure is performed. The limit of this counterclockwise rotation is determined by contact of stud 144 with limit stop 150.

Rear shutter blade 176 additionally includes cam 190 and lug 175. When the shutter is actuated, lug 175 contacts and applies torque to the post 174 which causes clamp member 170 to bear upon the vane 162, as previously described. This occurs just prior to the photographic exposure, that is, just before shutter aperture 128 moves across the apertures of rear shutter blade 176 and plate 186. Movement of the rear shutter blade in a counterclockwise direction, as biased by spring 180, is limited by a stop 194.

The rear shutter blade is rotated to cocked position by cocking lever 78, rigidly attached thereto. It is held at this position by the shutter release pawl 196 which engages flange 198 of the cocking lever. Pawl 196 is biased toward engagement by spring 200 and its movement is limited by a stop 202. The release pawl is actuated by the shutter release button 82 through the intermediary of the flexible cable 76. The tip of the actuating wire in the flexible cable is at a position, as provided by holding bracket 77, to actuate the pawl 196 only when the camera is at open position with the camera bellows 14 and linkage 16 properly extended. The cross member 16d, on which the pawl is mounted, is rotated through closing movement of the links 16a and 16b and carries the cable wire tip out of contact with the pawl. This constitutes an interlock means which prevents an exposure unless the camera is basically correctly adjusted. The camera cannot be closed unless the cocking lever 78 is slightly retracted to cocked position. This insures that the shutter blades are at best position to prevent any light leak which is of importance inasmuch as the camera has no front cover.

The speed at which the shutter operates is controlled by the location of the aperture in vane 162 with respect to the orifices to the air chamber. During the first part of the cycle of shutter operation, this location controls the amount of air which is allowed to escape through the orifices and vane aperture from the pneumatic bellows which is undergoing contraction by reason of the clockwise movement of arm 140, under bias applied from the rear shutter blade spring 180 via cam 188 and plate 130. During the second part of the cycle of shutter operation when the front shutter spring 152 assumes control, arm 140, as previously described, is caused to rotate in a counterclockwise direction thus causing the pneumatic bellows 148 to expand. During this operation the position of the vane 162 therefore controls the amount of air permitted to be drawn into the orifices, air chamber and bellows and thus controls the speed of the actual exposure which, as noted, occurs during this portion of the cycle.

Completing the description of the shutter and electrical switch actuating mechanism, a pivotal arm 204 compound of an electrical insulating material, such as Micarta or the like, is mounted for rotation about a pivot 206. Arm 204 comprises cam followers 208 and 210, electrical contact 212, adjusting screw 214 for varying the position of contact 212 and a cable-connecting lug 216 to which an end of electrical cable 217 is soldered. Cable 217 leads to one contact of the socket 224. When arm 204 is permitted to rotate in a clockwise direction, a flash synchronizing switch composed of the movable contact 212 and a fixed contact 218 closes and thus actuates the flashgun 220 of FIGS. 10a, 10b or 10c or the radio transmitter 222 shown in FIG. 13, depending upon which unit is mounted in the socket 224. Spring element 226 biases arm 204 for rotation in a clockwise direction but the contacts are held open by the action of cam elements 134 and 136 bearing sequentially against cam follower 208 during the counterclockwise rotation of plate 130. It is only during the transitional phase of the aforesaid rotation of the plate 130 intervening between the contact of cam element 136 against cam follower 208 and the contact of cam element 134 against the latter that the contacts are momentarily closed. The fixed electrical contact 218 is electrically connected to ground, namely, to the mounting plate 125. In turn plate 125 is electrically connected to one side of the 1½ volt battery 62 by means of battery clips 63.

At the position shown in FIG. 6, which assumes the shutter to be at the uncocked position after completing a photographic exposure, it will be observed that cam 134 of the front shutter plate 130 is in contact with cam follower 208 of the pivotal arm 204 thus holding contacts 212 and 218 apart. When the shutter is cocked, cam 190 of the rear shutter blade 176 is rotated in a clockwise direction and brought into contact with cam follower 210. Upon release of the cocking lever by withdrawal of pawl 196 the following sequence takes place. Through coincidental clockwise rotation of front shutter blade 126 and counterclockwise rotation of rear shutter blade 176, cam 134 is removed from cam follower 208; cam 190 stays in contact with cam follower 210 for a brief period, thus maintaining the separation of electrical contacts 212 and 218; and cam 136 then moves into contact with cam follower 208, further continuing their separation. At this stage cam 188 of the rear shutter blade 176 passes beyond cam follower 138 of the front shutter blade, the rear shutter blade comes to rest against stop 194, and the front shutter blade commences its return counterclockwise rotation. Cam 136 simultaneously commences its withdrawal from cam follower 208 and electrical contacts 212 and 218 move toward closure position without further impediment. Timing of these procedures is adjusted so that the electrical contacts are closed at a point in time which is approximately twelve milliseconds prior to maximum alignment of shutter and diaphragm apertures thus permitting full transmittal of light for any given setting of the diaphragm. This period permits the lamp filament to be heated to proper temperature for maximum brightness.

Closing of the contacts is momentary and they return to open position substantially immediately, as determined by the return of cam 134 to contact with cam follower 208. This avoids any possibility of inadvertenty firing a replacement flashbulb during its insertion.

Figure 7:
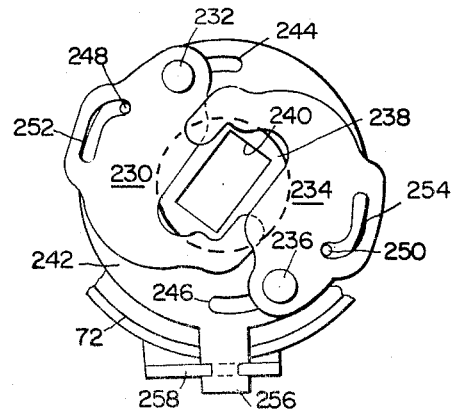
FIG. 7 is a diagrammatic perspective view of the diaphragm adjusting mechanism.

In FIG. 7, there is shown, from the rear, an assembly of the diaphragm elements which are positioned in camera front 18 behind the lens 94. A first blade 230 is pivotally mounted by a stud 232 and a second blade 234 is pivotally mounted by a stud 236. The studs are fastened to a fixed cup-like plate 238 having a central rectangular aperture 240. A second cup-like plate 242 having a large circular aperture, exceeding in diameter the maximum dimension of rectangular aperture 240, is mounted for rotation to the rear of plate 238 and comprises circular slots 244 and 246 through which studs 232 and 236 pass freely. Plate 242 also includes pins 248 and 250 which extend through curved slots 252 and 254 formed in blades 230 and 234, respectively, and a connecting lug 256 which, when the diaphragm is positioned in the camera, is in contact with a driving arm 258 attached to adjusting bezel 72. Rotation of the lug 256 causes the pins 248 and 250 to varyingly bear against the edges of slots 252 and 254 in a camming operation thereby causing the diaphragm aperture to assume various sizes and shapes shown in detail in FIG. 8.

FIG. 8 is generally self-explanatory and relates to a preferred exposure range and diaphragm range of the camera of the convention. The vane referred to in the table is vane 162. The various diaphragm openings are depicted beneath the applicable f/values. It will be noted that although the diaphragm aperture assumes various modifications of shape, the width is held approximately constant. The shutter blade aperture width is similar thereto and this contributes to the effectiveness of the shutter operation. Full shutter opening would be represented as a sharp peak on a curve of shutter operation.

FIG. 9 is a simplified schematic diagram of the optical system, showing the general relation of front-curving meniscus lens 94 and the focal plane 35. A lens of this type is practicable because of the relatively small aperture employed, edge corrections thereby being avoided.

Figure 10A:
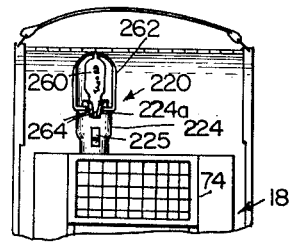
FIG. 10 is a diagrammatic view illustrating the several functional positions of the camera flashgun.
Figure 10B:
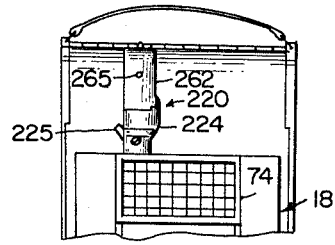
Figure 10C:
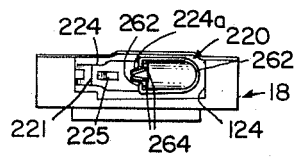

FIGS. 10a, 10b and 10c illustrate the various possible positions of the socket 224 which may be employed in conjunction with the flashgun 220. The socket is pivotally mounted at 221 in recess 124 which is formed in camera front 18 at the end adjacent to photovoltaic cell 74. In FIG. 10a, the flashgun, comprising bulb 260 and reflector 262 is positioned so as to face straight ahead toward a photographic subject. The socket 224 includes a cut-away portion 224a, bulb ejector 225 and a pair of terminals 264 permitting a conventional flashbulb base to be inserted from the side rather than from the end. This permits installing the bulb without removing the reflector 262 which is of an extremely small size enabling retraction of the entire unit in recess 124. Although so small in size, the reflector is adequate because of the extremely fast characteristics of the high speed film which the camera of the invention is adapted to utilize. Use of a compact reflector also tends to eliminate the so-called "hot spot" of light which is frequently found to be incident upon the photographic subject through the use of more conventional reflectors, which is of advantage.

FIG. 10b illustrates the flashgun at correct position either for bounce flash operation when the camera is held horizontally or for close-up photography when bounce flash is not possible because of the proximity of the subject. In the latter instance, the small orifice 265 formed in reflector 262 permits an amount of light to fall upon the subject which is similar to that which would be the case if the subject were slightly more distant and bounce flash possible. For this purpose, assuming a light bulb having a light output of approximately 7000 lumiseconds, a circular orifice having a diameter of ⅛ inch produces excellent results.

In FIG. 10c the flashgun 220 is shown retracted within recess 124. At this position and with bulb installed it is properly disposed for bounce flash operation when the camera is held vertically. It is also correctly located for closing of the camera during non-use.

Figure 11:
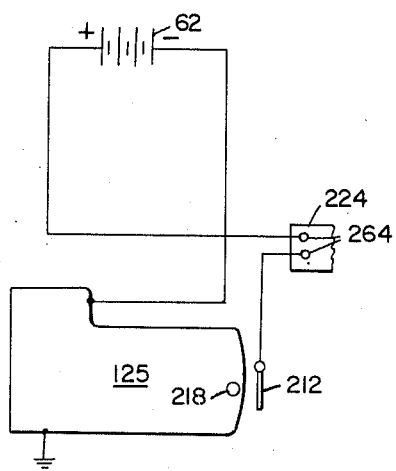
FIG. 11 is a wiring diagram of the battery and switching means.

FIG. 11 is a wiring diagram of the circuit involving the 1½ volt battery 62, the socket 224, the electrical contacts 212 and 218 of the mechanism of FIG. 6, and the mounting plate 125 for this mechanism. This circuit is employed for operating the flashgun 220 and, with possible small modifications, to be described below, for operating the radio transmitter 222.

FIG. 12 shows, from a viewing position facing the camera from the front, the battery 62, the battery clip 63, and means for removing a spent battery from the clip, in detail. The battery clip is formed of resilient pieces 63a and 63b which make electrical contact with the opposite ends of the battery. These pieces are electrically insulated from one another, as by central insulating member 63c. The clip is mounted in a recessed area of the camera back 12, as generally shown in FIG. 1. A tab 63d composed of a resilient material such as a springy metal contributes to releasably hold the battery in mounted position. A tape 266 having a grommet 268 is attached to the under side of the central portion of the clip, passes around the rear of the battery, and extends forwardly from the under side thereof, as shown. The electrical cable 70 passes through the grommet and has a retaining collar 70c on the far side. Leads 70a and 70b carried by the cable are connected to the battery clip end pieces 63a and 63b. One of these leads connects the battery with socket 224; the other connects the battery with mounting plate 125 which constitutes a common ground. An exhausted battery is manually removed by drawing upon cable 70. This exerts an ejecting force on tape 266 and the battery is freed from the clip 63.

Figure 13:
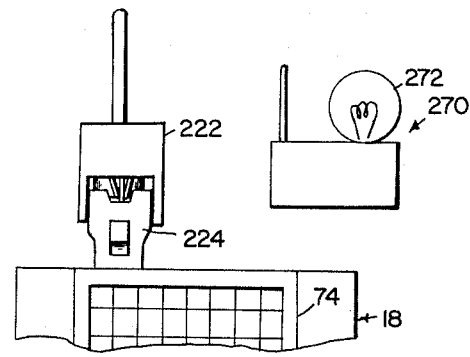
FIG. 13 is a diagrammatic illustration of dual purpose mounting means of the camera for mounting either a flashgun or a radio transmitting device which operates, by remote control, a stroboscopic lighting unit, the latter being indicated diagrammatically.

In FIG. 13 the socket 224 is shown with reflector 262 removed and the radio transmitter 222 mounted therein. The electrical terminals 267 (FIG. 15) of the transmitter base are substantially similar to those of the flashgun so that either unit may be interchangeably mounted in the socket 224. A remotely positioned radio receiver 270, having an associated strobe flash lamp 272 which is energized by a received radio pulse from the transmitter 222 is schematically shown.

Figure 14:
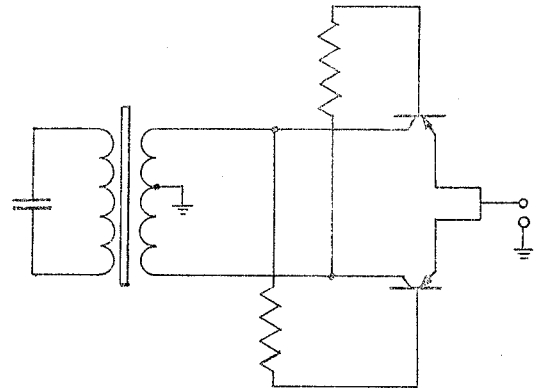
FIG. 14 is a wiring diagram of a radio transmitting device for use in the present invention.
Figure 15:
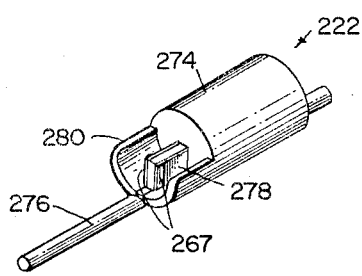
FIG. 15 is a diagrammatic view of the radio transmitting device.

FIG. 14 is a wiring diagram of the radio transmitter circuit. FIG. 15 shows the radio transmitter in somewhat greater detail. The electrical components are sealed within the cylindrical body 274 which may, appropriately, be formed of a molded plastic insulating material. The connecting terminals for inserting the unit in socket 224 are shown at 267. Element 276 is the transmitter antenna, in the form of a rod attached to the body 274.

The transmitter 222 is a miniaturized assembly, approximately similar in size to the flashgun reflector 262. Thus it readily fits into the recess 124 of the camera front 18 when the socket is pivoted to the retracted position. An elongated insulating board 278 of the type used in printed circuitry is preferably used for supporting the components of the transmitter, the external end of this board, which is shown in the illustration, having the transmitter terminals 267 "printed" on opposite sides thereof so as to cooperate with the socket contacts 264 when the transmitter is plugged into the socket 224. A halfcircular shroud 280, integral with the transmitter main body 274, is shown as partially surrounding the transmitter terminals 267. The antenna rod 276 may be encased in a suitable plastic material which, if desired, may be integral with the transmitter body 274. The antenna is so positioned relative to the transmitter body that when the transmitter is mounted in socket 224, the antenna does not come into contact with the camera front 18 or interfere with any other element. The socket 224 is preferably pivoted to open position when the transmitter is used so that the antenna projects outwardly for maximum effectiveness. The transmitter is preferably mounted in socket 224 with the latter extending outwardly from recess 124 at the position shown in FIG. 13. This insures that the antenna is positioned for maximum effectiveness.

The radio transmitter 222 is of conventional design, being a simple inductively-loaded oscillator comprising a pair of 2N1637 transistors connected in push-pull to the primary winding of the antenna coil. The secondary winding of the antenna coil is connected across a condenser, and the two windings are wound together on a ferrite rod which comprises the antenna for the transmitter. The transmitter is powered by the camera battery and normally draws 450 milliwatts of energy for sustaining a transmitting signal of 40 kilocycles. This signal is strong enough to reach a radio receiver 270 located as much as 30 feet away from the transmitter, and when detected thereby, produces a control signal for triggering the strobe flash lamp 272.

Since the transmitter 222 plugs into the flashgun socket 224 and requires no time delay to begin oscillating, because a transistor requires no warm-up period, the strobe unit, assuming the condenser to be charged, will fire immediately upon closure of the switch elements 212 and 218. At an effective shutter speed of $\frac{1}{45}$ second, which is the approximate shutter speed of the present invention at low ambient light levels, the shutter will not be fully open when the flash synchronizing switch closes, it having been noted hereinbefore that approximately 12 milliseconds are required after switch closure to synchronize full shutter opening with peak brilliance of an AG1–1 type flash tube, manufactured by Sylvania Electric Products, Inc. Accordingly, about 10% of the available strobe flash would be lost because of the smaller shutter opening. If it is desired to use all of the light from the strobe unit, a manually operated single-pole double-throw switch may be added adjacent to the shutter mechanism to provide selective switching between the photovoltaic cell 74 and an auxiliary current source for the galvanometer 160 comprising the battery 62 and a fixed resistor. The fixed resistor would have a predetermined resistance value such that a current would flow through the galvanometer which is of an amperage proper for rotating the galvanometer vane 162 to a correct position for the aforementioned purpose. This position is one which would provide a shutter speed fast enough to give approximately full shutter opening when the switch contacts 212 and 218 were closed.

Since certain changes may be made in the foregoing apparatus without departing from the scope of the invention herein involved, it is intended that all matter contained in the above description or shown in the accompanying drawings shall be interpreted as illustrative and not in a limiting sense.

What is claimed is:

1. In a photographic camera including a housing and exposure means within said housing adapted to operation with a flashgun, the combination of flashgun means comprising a generally rectangular recess formed in one side of said camera housing, a mounting element hingedly attached to said housing within and adjacent to one extremity of said recess for permitting pivotal movement of said element in a given plane, a socket rotatably attached to said mounting element for accepting and establishing electrical contact with a flashlamp, and a generally hood-shaped reflector having an open face releasably mounted on said socket, the aforesaid hinged attachment of said mounting element permitting said flashlamp, when mounted in said socket, to be pivotally moved in said given plane in-and-out of said recess to various angular positions including a maximum upright position substantially at 90° to said side of the camera housing and to another position completely retracted within said recess so as to lie substantially parallel to said side of the housing, and the aforesaid rotatable attachment of said socket permitting said flashlamp, socket and reflector to be rotated as a unit in a plane normal to said given plane, whereby said open face of the reflector may be so disposed as to permit the projection of light rays in a plurality of predetermined directions with respect to the optical axis of the camera lens for selective purposes of direct illumination and bounce flash illumination.

2. In a photographic camera, the combination defined in claim 1, wherein said flashlamp is of relatively short substantially tubular dimensions and wherein said reflector generally conforms to the contour of, and is but slightly larger than, said flashlamp.

3. In a photographic camera, the combination defined in claim 1, wherein said reflector includes a relatively small perforation formed therein for the transmission of a small amount of light along a generally horizontal axis approximately at 90° to the axis of light transmitted through said open face, said small perforation being operative when it is facing the photographic subject while said open face is directed to one side, the light transmitted by said small perforation being appreciably less than that transmitted by said open face.

4. In a photographic camera, the combination defined in claim 1, wherein said socket includes a cut-away portion for side mounting of said flashlamp, without necessitating the removal of said reflector.

5. In a photographic camera, the combination defined in claim 1, wherein said flashgun means are located at the camera front.

6. In a photographic camera, the combination defined in claim 5, wherein said flashgun means are located immediately adjacent to a battery for energizing said flashlamp.

References Cited by the Examiner

UNITED STATES PATENTS

| | | | |
|---|---|---|---|
| 1,768,315 | 6/30 | Goldhammer | 95—45 |
| 2,011,895 | 8/35 | Goldhammer | 95—53 |
| 2,020,741 | 11/35 | Rush | 95—11.5 |
| 2,491,719 | 12/49 | Fairbanks | 95—13 |
| 2,501,405 | 3/50 | Noel | 240—1.3 |
| 2,776,364 | 1/57 | Daniels | 240—1.3 |
| 2,866,082 | 12/58 | Clayton | 240—8.3 |
| 2,925,764 | 2/60 | Sauer | 95—64 |
| 2,967,469 | 1/61 | Lachaize | 95—11 |
| 2,995,073 | 8/61 | Lothrop | 95—10 |
| 2,966,964 | 8/61 | Fischer | 95—10 |
| 3,018,707 | 1/62 | Whittier | 95—11.5 |

NORTON ANSHER, *Primary Examiner.*

JOHN M. HORAN, *Examiner.*